United States Patent [19]

Momochi

[11] Patent Number: 5,440,368
[45] Date of Patent: Aug. 8, 1995

[54] CAMERAS

[75] Inventor: Nobuchika Momochi, Kanagawa, Japan

[73] Assignee: Sony Corporation, Japan

[21] Appl. No.: 966,512

[22] Filed: Oct. 26, 1992

[30] Foreign Application Priority Data

Oct. 31, 1991 [JP] Japan .................... 3-286779

[51] Int. Cl.$^6$ ................................. G03B 15/05
[52] U.S. Cl. ........................ 354/415; 354/420
[58] Field of Search ............ 354/415, 429–434, 354/422, 423, 420

[56] References Cited

U.S. PATENT DOCUMENTS

| Re. 32,437 | 6/1987 | Taniguch et al. | 354/432 X |
| 4,291,979 | 9/1981 | Yuasa et al. | 354/415 |
| 4,496,230 | 1/1985 | Nakai et al. | 354/431 X |
| 4,514,073 | 4/1985 | Taniguchi et al. | 354/431 X |
| 4,769,666 | 9/1988 | Kumakura | 354/431 X |
| 5,164,759 | 11/1992 | Yasukawa | 354/415 |
| 5,172,157 | 12/1992 | Takagi | 354/415 |

Primary Examiner—Russell E. Adams
Attorney, Agent, or Firm—Ronald P. Kananen

[57] ABSTRACT

A camera having an electronic flash that is energized on the basis of a release signal comprises a control unit for controlling an amount of a light emitted from the electronic flash, a measuring unit for measuring an amount of a light incident thereon through a lens system, and a memory for storing data indicative of the light amount measured by the measuring unit. The control unit controls the electronic flash in such a manner that, after the electronic flash is energized during a first period of time when the release signal is input, on the basis of data stored in the memory and light reading data measured by the measuring unit when the electronic flash is energized during the first period of time, the electronic flash is re-energized only during a second period of time.

11 Claims, 3 Drawing Sheets

5,440,368

CAMERAS

BACKGROUND OF THE INVENTION

1. Field of the Invention

The present invention generally relates to cameras and, more particularly, to a camera in which an electronic flash is energized to radiate an object with a light radiated therefrom to thereby take a picture of the object.

2. Description of the Related Art

In conventional cameras, such as a so-called single-lens reflex camera or the like in which a focal length of a lens is varied when a picture of an object is taken, there is employed a method in which a sensor or the like is disposed on the outside of a main optical system and an amount of light to be produced from an electronic flash is controlled on the basis of a detected value from the sensor.

When the above control method is employed, the amount of light from the electronic flash cannot be adjusted properly because the radiation angle and radiation range of the electronic flash are varied depending upon the focal length.

To avoid the above disadvantage of the conventional method, a light reading method known as a direct light reading method has been adopted recently.

According to the direct light reading method, when the electronic flash is energized, a reflected light from the surface of a film is read by a sensor and an amount of light radiated from the electronic flash is controlled on the basis of the measured result of the light reading.

When the amount of light from the electronic flash is controlled according to the direct light reading method, a plurality of direct light reading elements are required. Therefore, the control unit of the electronic flash cannot be substantially mounted on a camera since a sensor that measures an amount of light radiated from an electronic flash cannot be disposed on the optical system thereof from a physical standpoint.

In a camera such as an electronic still camera which utilizes CCD (charge-coupled device) elements instead of a film, the main optical system has no plane on which an incident light is irregularly reflected. Also, a proper light reading element cannot substantially be disposed outside of the range of the condenser lens system.

Further, since most of the CCD elements have a small image size as compared with the film, the focal length of the equivalent lens can be reduced, thus making it impossible to keep a space in which an element that converges a reflected light from a picked-up object is disposed.

Furthermore, even when a light that was irregularly reflected on the film surface is read, the light thus irregularly reflected on the film surface can be converged at the position distant from the film surface, thereby making it difficult to effect a so-called spot light reading and a so-called split light reading.

Consequently, when a parallax with the electronic flash and the radiation angle of the electronic flash are corrected or when the amount of light from the electronic flash is controlled momentarily, a fine control such as a logical judgement, a comparison with a value read by a main light reading system without light emission or the like, cannot be effected. Therefore, a satisfactory flashlight photography cannot be effected.

OBJECTS AND SUMMARY OF THE INVENTION

Therefore, it is an object of the present invention to provide an improved camera having an electronic flash in which the aforesaid shortcomings and disadvantages of the prior art can be eliminated.

More specifically, it is an object of the present invention to provide a camera having an electronic flash in which a parallax with an electronic flash and a radiation angle of light from the electronic flash can be corrected without using a so-called direct light reading element.

It is another object of the present invention to provide a camera having an electronic flash in which when the amount of light from the electronic flash is controlled momentarily, a fine control such as a logical judgement, a comparison with a value read by a main light reading system without light emission or the like can be effected.

It is a further object of the present invention to provide a camera having an electronic flash in which a satisfactory flashlight photography can be effected.

According to an aspect of the present invention, there is provided a camera having an electronic flash that is energized on the basis of a release signal. This camera comprises a control unit for controlling an amount of a light emitted from the electronic flash, a measuring unit for measuring an amount of a light incident thereon through a lens system, and a memory for storing data indicative of the light amount measured by the measuring unit, wherein the control unit controls the electronic flash in such a manner that, after the electronic flash was energized during a first period of time when the release signal is input on the basis of data stored in the memory and light reading data measured by the measuring unit when the electronic flash is energized during the first period of time, the electronic flash is re-energized only during a second period of time.

BRIEF DESCRIPTION OF THE DRAWINGS

A better understanding of other objects, features, and advantages of the present invention can be gained from a consideration of the following detailed description of an illustrative embodiment thereof, in conjunction with the figures of the accompanying drawings, wherein.

DETAILED DESCRIPTION OF THE PREFERRED EMBODIMENT

A camera according to an embodiment of the present invention will be described with reference to the drawings.

Figure 1:
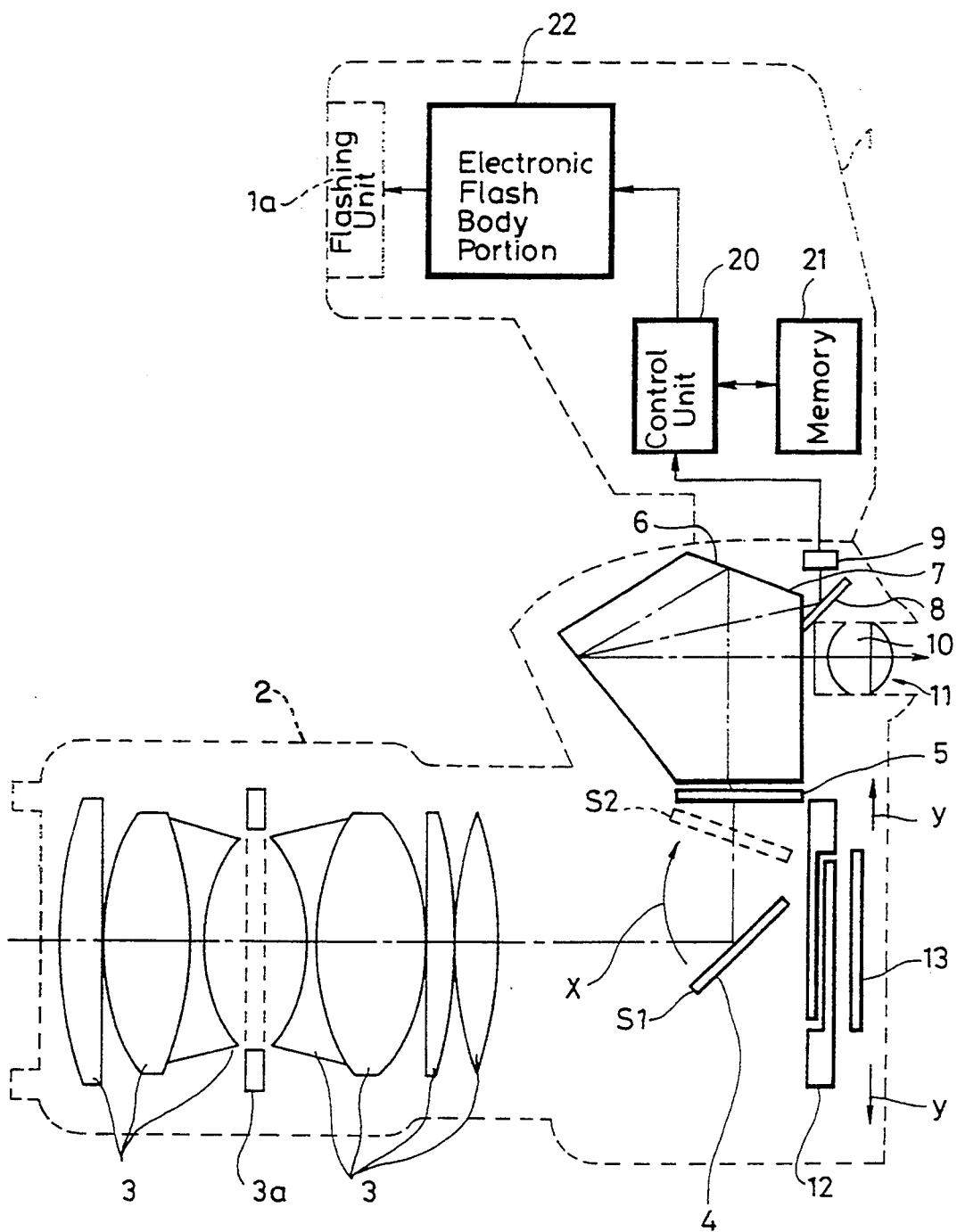
FIG. 1 is a schematic side view showing a structure of a camera according to an embodiment of the present invention.

FIG. 1 of the accompanying drawings shows a structure of a camera according to an embodiment of the present invention. A camera body 2 will be described first. In FIG. 1, reference numeral 3 denotes a lens system which causes a light of an object image to be focused on the inside of the camera as shown by a one-dot chain line.

In FIG. 1, reference numeral 3a denotes an aperture. This aperture 3a is adapted to adjust the amount of the light of the object image which is introduced into the inside of the camera. This aperture 3a is also used to determine a depth of a field.

A light passed through the aperture 3a is traveled through the lens system 3, reflected on the reflection surface of a quick return mirror 4 and introduced into a focusing screen 5. The light passed through the focusing screen 5 is introduced into a pentaprism 6 as shown by a one-dot chain line in FIG. 1.

The light incident on the pentaprism 6 is repeatedly reflected inside the pentaprism 6 as shown by a one-dot chain line and then introduced into an eyepiece 10 and a lens 7.

The light that was introduced into the eyepiece 10 is magnified and served as a light for a viewfinder 11.

A cameraman can visually confirm a present target object through the viewfinder 11.

The light incident on the lens 7 is converged by this lens 7, for example, and then introduced into a reflection surface of a reflection mirror 8.

The light incident on the incident surface of the reflection mirror 8 is reflected by this reflection surface and then introduced into a light reading sensor 9.

The light reading sensor 9 can measure the light supplied thereto through the lens system 3 in this way.

This light reading sensor 9 supplies read data, which was provided by reading the light, to a control unit 20 that will be described later on.

The light travels through the above-mentioned optical path as described above when the quick return mirror 4 is disposed at a position S1 shown by a solid line in FIG. 1, or when a release button (or shutter button), not shown, is not pressed.

Operation in the case such that the release button (not shown) of the camera is pressed will be described next.

When the release button of the camera is pressed, the quick return mirror 4 is rotatably moved from the position S1, shown by the solid line in FIG. 1 to a position S2 shown by a broken line in the direction shown by an arrow x in FIG. 1.

Then, a focal plane shutter 12 is moved as shown by an arrow y in FIG. 1, whereby the focal plane shutter 12 is set in its opened state. Also, the light from the lens system 3 is traveled through the focal plane shutter 12 thus opened and then introduced onto a sensitization surface of a film 13.

Thereafter, the focal plane shutter 12 is moved in the direction opposite to the arrow y direction on the basis of a shutter value based on the data of light that was read in advance or a shutter value that was determined in advance in a manual fashion. As a consequence, the focal plane shutter 12 is set in the state shown by the solid line in FIG. 1, or in its closed state.

Accordingly, the sensitization surface of the film 13 is exposed during a predetermined period of time to thereby pick up an image of the object.

Various parameters such as an aperture value of the aperture 3a, etc., are determined in advance either in an automatic or manual fashion similarly as described above.

An electronic flash 1 and various control units will be described below.

Referring to FIG. 1, the electronic flash 1 comprises an electronic flash body portion 22 and a flashing unit 1a.

The electronic flash body portion 22 energizes the flashing unit 1a in response to a control signal from the control unit 20 which will be described later.

The control unit 20 stores read-out data, which is provided under the condition such that the flashing unit 1a is not energized and which is generated from the light reading sensor 9 that will be described later, in a memory 21. Then, the control unit 20 supplies the control signal to the electronic flash body portion 22 before the shutter 12 is opened by pressing a release button (not shown) so that the flashing unit 1a is preliminarily energized (this condition will hereinafter be referred to as a preliminary flashing mode).

The control unit 20 compares read-out data, which is provided by reading a reflected-back light from the light-reading sensor 9 after the flashing unit 1a was energized preliminarily, with the data stored in the memory 21 and which data is provided under the condition such that the flashing unit 1a is not energized, to thereby obtain the control signal corresponding to the compared result. This control signal is supplied from the control unit 20 to the electronic flash body portion 22 which then energizes the flashing unit 1a.

The control unit 20 and the memory 21 may be disposed either within the electronic flash 1 or within the camera body 2. Further, the electronic flash 1 may be either detachably attached to the camera body 2 or formed as one body with the camera body 2.

As set forth, according to this embodiment, when the flashing unit 1a of the electronic flash 1 is energized by the electronic flash body portion 22, the flashing unit 1a is energized in the preliminary flashing mode by the control unit 20. Then, the read-out data stored in advance in the memory 21 and generated from the light-reading sensor 9 under the condition such that the flashing unit 1a of the electronic flash 1 is not energized and the read-out data supplied from the light-reading sensor 9 under the condition that the flashing unit 1a is energized in the preliminary flashing mode are compared with each other. Then, the flashing unit 1a of the electronic flash 1 is energized on the basis of the compared result.

The above-mentioned process will be described more fully hereinafter.

Figure 2:
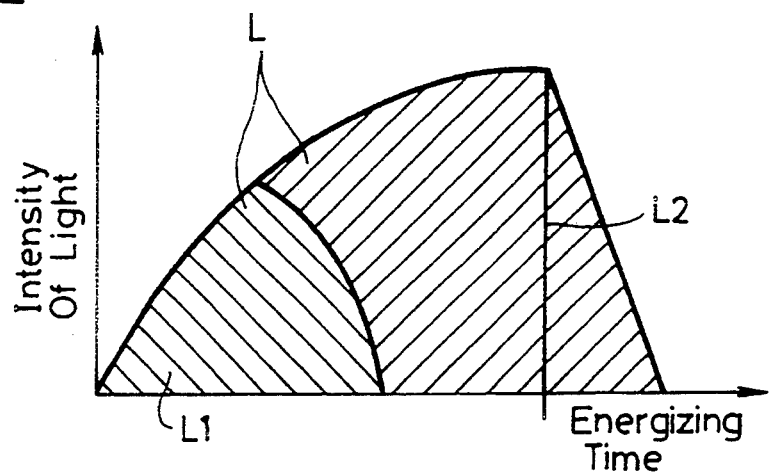
FIG. 2 is a graph used to explain the embodiment of the camera according to the present invention.

FIG. 2 of the accompanying drawings is a graph showing measured result of a lighting amount L (necessary lighting amount) when the flashing unit 1a of the electronic flash 1 is energized where the ordinate indicates an intensity of the light and the abscissa indicates the energizing time of the electronic flash 1.

As shown in FIG. 2, of the lighting amount L, the lighting amount in the preliminary flashing mode falls in a range shown by L1, and the lighting amount necessary for taking a picture of an object falls in a range shown by L2.

According to this embodiment, a table that presents the graph of FIG. 2 is stored in the memory 21, for example.

While an aperture value, a shutter speed, etc. are determined on the basis of the data thus read-out just before the release button is pressed, i.e., just before the shutter 12 is opened after the release button is pressed in the ordinary camera sequence, according to this embodiment, when the camera is set in the electronic flash mode, the electronic flash is controlled in the preliminary flashing mode.

Although the electronic flash must be energized to radiate a light the amount of which must be increased in proportion to the square of a distance between it and the object, if the above object distance information can be calculated from an information of a distance ring of the lens or the like, then the lighting amount L2 may be varied.

This lighting amount L2 of the electronic flash 1 need not always be a proper value for the exposure.

The electronic flash lighting amount L2 can be controlled on the basis of the energizing time as shown in FIG. 2 so that, when a difference ΔS between the measured data, which is obtained on the basis of the proper small lighting amount L1, and the read-out data stored in the memory 21 (i.e., read-out data provided when the flashing unit 1a of the electronic flash 1 is not energized), then the necessary lighting amount L2, i.e., the energizing time can be predicted.

This relationship is expressed by the following equation (1):

$$\Delta S = S_p - S_0 \quad (1)$$

where ΔS is the increased value of the light emission read-out in the preliminary flashing mode, $S_p$ is the measured value of the radiated light in the preliminary flashing mode and $S_0$ is the value of the radiated light amount measured just before the release button is pressed.

While the aperture value and the shutter value also are used to control the exposure in addition to the above-mentioned difference ΔS, the aperture value may be taken into consideration in order to determine the lighting amount L2 because the energizing time of the electronic flash is shorter than the operation time of the shutter 12.

Assuming that S (constant) represents an observed value measured when the proper radiation of light is carried out in the full aperture, then the necessary lighting amount L can be expressed by the following equation (2).

$$L = \frac{L_p}{2^{(\frac{A_v}{A_{v0}})}} \times \frac{S}{\Delta S} \quad (2)$$

where $L_p$ is the lighting amount in the preliminary flashing mode, $A_v$ is the aperture value and $A_{v0}$ is the full-aperture value.

Operation for controlling the lighting operation of the flashing unit 1a of the electronic flash 1 in the above preliminary flashing mode will be described with reference to a flowchart forming FIG. 3.

Figure 3:
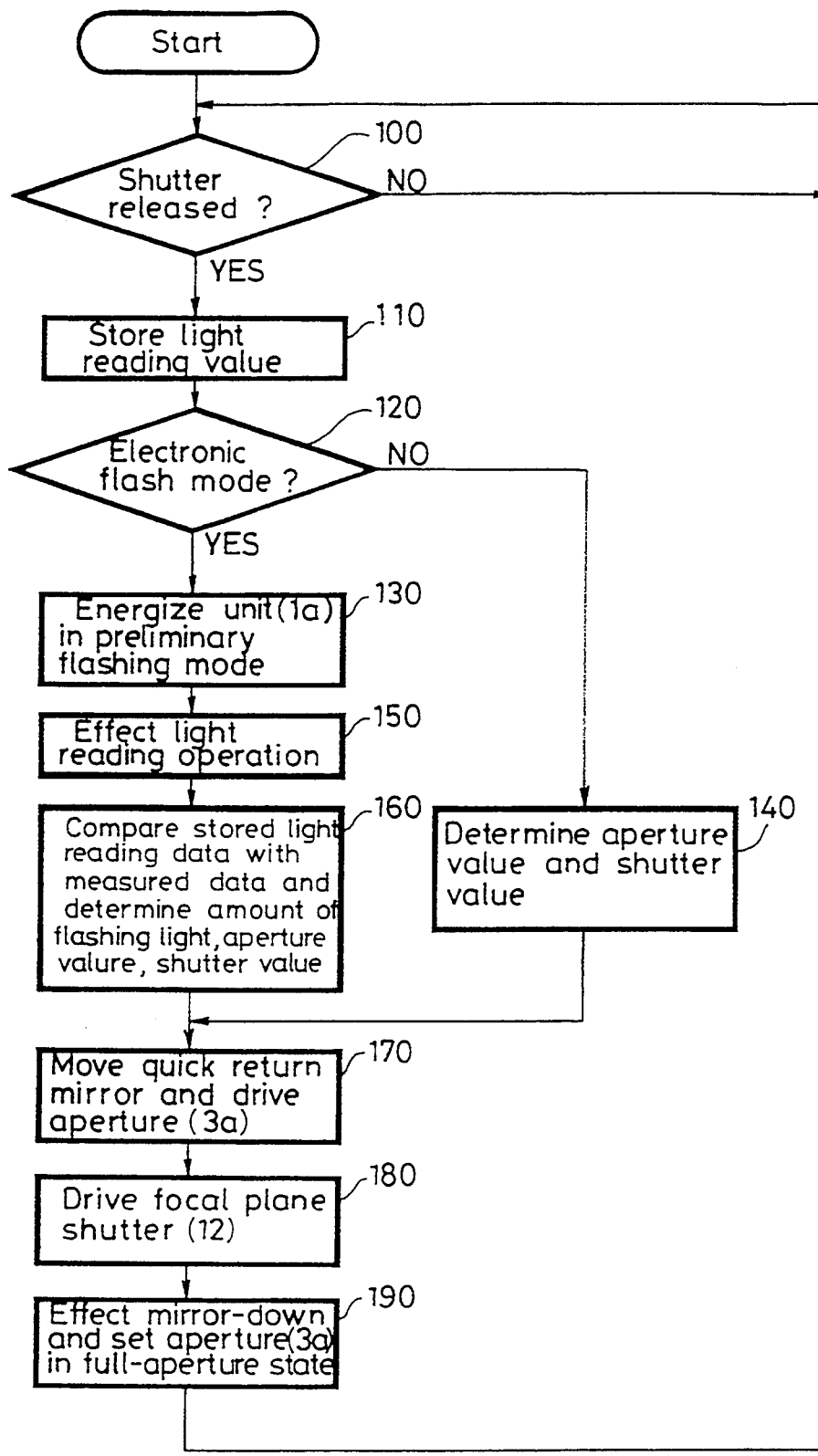
FIG. 3 is a flowchart to which references will be made in explaining the embodiment of the camera according to the present invention.

As shown in FIG. 3, following the Start of operation, it is determined in decision step 100 whether or not the shutter is opened, i.e., the release button is pressed. If a YES is output at decision step 100, then the processing proceeds to step 110.

In step 110, a read-out value (read-out data) is stored. That is, under the condition that the flashing unit 1a of the electronic flash 1 is not energized, the read-out data from the light reading sensor 9 is stored in the memory 21. Then, the processing proceeds to the next decision step 120.

In decision step 120, it is determined whether or not the electronic flash 1 is set in the electronic flash mode. If a YES is output at decision step 120, then the processing proceeds to the next step 130. Whereas, if a NO is output at decision step 120, then the processing proceeds to step 140.

In step 130, the control signal is supplied to the electronic flash body portion 22 to thereby energize the flashing unit 1a of the electronic flash 1 in the preliminary flashing mode. Then, the processing proceeds to step 150.

In step 140, when the camera 2 is not in the electronic flash mode, the aperture value and the shutter value are determined on the basis of the data thus read-out in step 110. Then, the processing proceeds to step 170.

In step 150, the reading operation is carried out. That is, when the flashing unit 1a is energized in the preliminary flashing mode, read-out data from the light-reading sensor 9 is obtained. Then, the processing proceeds to step 160.

In step 160, light reading data, read out by the light reading sensor 9 when the flashing unit 1a of the electronic flash 1 is not energized and read out from the memory 21, is compared with light reading data thus read-out in step 150, i.e., light reading data read out by the light reading sensor 9 when the flashing unit 1 is energized in the preliminary flashing mode. Then, the lighting amount of the flashing unit 1a of the electronic flash 1, the aperture value and the shutter value are determined on the basis of the compared result. Then, the processing proceeds to step 170.

In step 170, the mirror-up operation is carried out, i.e., the quick return mirror 4 (see FIG. 1) is moved from the solid line position S1 to the broken line position S2 as shown by the arrow x and the aperture 3a is driven on the basis of the aperture value. Then, the processing proceeds to step 180.

In step 180, the shutter, i.e., the focal plane shutter 12 (see FIG. 1) is moved in the direction shown by an arrow y and then in the direction opposite to the arrow y direction in response to the shutter value, therefore. Thereby, the focal plane shutter 12 is opened and closed. Then, the processing proceeds to step 190.

In step 190, the mirror-down is effected, i.e., the quick return mirror 4 (see FIG. 1) is moved from the broken line position S2 to the solid line position S1 in the direction opposite to the arrow x direction. Also, the aperture 3a is driven and is set in the full-aperture state.

After the preliminary flashing mode, the flashing unit 1a is continuously energized in order to take a picture of an object (i.e., in the electronic flash mode). The lighting operation is finished before the focal plane shutter 12 is closed.

Figure 4:
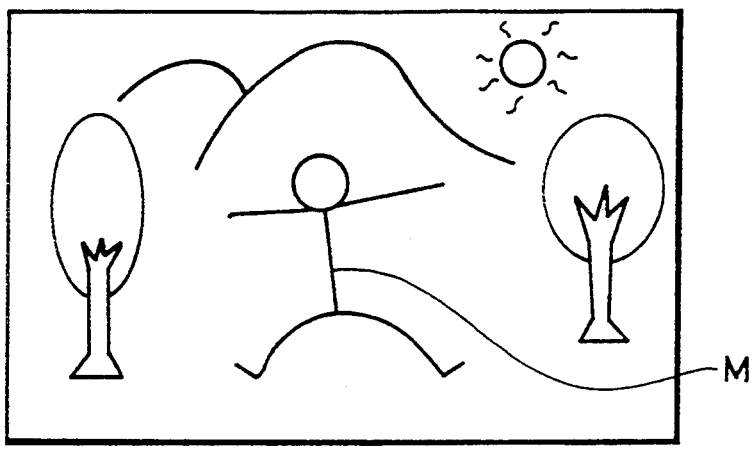
FIG. 4 is a schematic diagram used to explain the embodiment of the camera according to the present invention.

Further, according to this embodiment, when the light reading sensor 9 can read out the amount of the reflected light from an object M owing to the radiation of light from the flashing unit 1a of the electronic flash 1 in the state shown in FIG. 4 according to a so-called split light reading method, for example, or when a highly-sophisticated adjustment of the lighting condition such as a so-called full-in flash is carried out, the electronic flash 1 can be energized more accurately.

Figure 5:
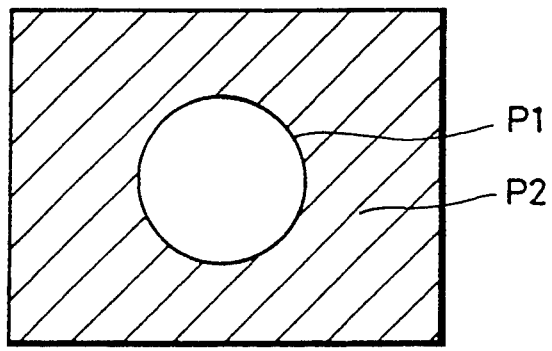
FIG. 5 is a schematic diagram used to explain the embodiment of the present invention.

FIG. 5 of the accompanying drawings is a diagram used to explain the above-mentioned split light reading operation wherein a hatched portion P2 is a neighborhood portion and P1 is a spot of light.

As shown in FIG. 4, a composition in which a main object M is located near the camera at the distant background is frequently observed when the cameraman takes a picture. In the case of a so-called back light, a light is compensated for by the radiation of light from the electronic flash.

A light radiated from the flashing unit 1a of the electronic flash 1 cannot reach the distant scene substantially. In that case, assuming that the light radiated from the flashing unit 1a of the electronic flash 1 cannot reach the distant scene, then a proper light amount can be determined on the basis of the aperture value and the shutter value.

According to the embodiment of the present invention, even in the split light reading process, the light amount can be controlled properly.

Initially, the preliminary flashing operation is carried out. At that time, two light measuring data concerning the spot P1 and the neighborhood P2 are obtained by the light reading sensor 9.

SP1 assumes light reading data of the spot P1 when the preliminary flashing operation is carried out, SP2 assumes light reading data of the neighborhood P2 when the preliminary flashing operation is carried out, SO1 assumes light reading data of the spot P1 just before the shutter is released, and SO2 assumes light reading data of the neighborhood P2 just before the shutter is released, respectively.

$\Delta S1$ and $\Delta S2$ respectively assume differences of the amounts of light which is radiated from the electronic flash 1 and reached to the spot P1 and the neighborhood P2. Then, $\Delta S1 = SP1 - SO1$ and $\Delta S2 = SP2 - SO2$.

These differences of light amount are values which are in inverse proportion to the square of the distance.

If the light reading value S that should be obtained inherently is obtained on the basis of the X times light reading time and the Y times lighting amount for the preliminary flashing mode, then two simultaneous equations can be obtained as $SO1X + \Delta S1Y = S$ and $SO2X + \Delta S2Y = S$.

Solving these two simultaneous equations can yield X and Y.

That is, these X and Y can provide the shutter value and the radiation amount of light from the electronic flash that should be set.

The light radiated from the electronic flash and the external light are equivalently changed with the aperture value so that, when the light amount is reduced to $\frac{1}{2}$ by the aperture 3a, the shutter value and the light radiation amount of the electronic flash are increased twice.

Even when the cameraman takes a picture according to the split light reading method, the shutter value (i.e., the light amount increased by the external light) and the radiation amount of light from the electronic flash can be controlled more accurately.

As described above, according to the embodiment of the present invention, since the flashing unit 1a of the electronic flash 1 is energized at the radiation amount of light based on the light reading data measured under the condition that the flashing unit 1a of the electronic flash 1 is not energized and light reading data measured when the flashing unit 1a of the electronic flash 1 is energized in the preliminary flashing mode, a parallax with the electronic flash and the radiation angle of the electronic flash can be corrected without using a so-called direct light reading element. Also, a fine control such as a logical judgement, a comparison with light reading value measured by a main light reading system without using the radiation of light or the like can be effected, whereby the cameraman can take a picture satisfactorily by using the electronic flash. Further, the so-called split light reading and the spot light reading can be combined with the light adjustment done by the electronic flash. Furthermore, since the flashing unit 1a of the electronic flash 1 is energized after the flashing unit 1a was energized in the preliminary flashing mode, it is possible to prevent eyes from becoming red when the cameraman takes a portrait picture.

As set forth above, according to the present invention, since the lighting operation of the electronic flash is controlled by the control means such that, when the release instruction signal is input, the electronic flash is energized during the first period of time and then the electronic flash is re-energized during the second period of time that is determined on the basis of the data stored in the memory means and the measured result provided by the measuring means when the electronic flash is energized during the first period of time, the parallax with the electronic flash and the radiation angle of the electronic flash can be corrected without using the so-called direct light reading element. Further, the fine control such as the logical judgement, the comparison with the light reading value done by the main light reading system without the radiation of light or the like can be effected unlike the case such that the radiation amount of light from the electronic flash is controlled momentarily. Therefore, the cameraman can take a picture by using the electronic flash. Furthermore, when the cameraman takes a picture under some special conditions such as the full-in flash mode or the like, the lighting amount of the electronic flash can be controlled more finely. Thus, the cameraman can take a picture under some special conditions.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A camera having an electronic flash that is energized on the basis of a release signal, comprising:

measuring means for measuring a first amount of light incident on said measuring means through a lens system and for outputting a first measured data indicative of said first amount of light, said measuring means measuring a second amount of light incident upon said measuring means during the emission of a first flash of light generated in response to said release signal and generating a second measured data signal;

memory means, connected to said control means, for storing said first measured data;

control means responsive to said release signal for generating a first control signal for causing said first flash of light to be emitted from said electronic flash during a first period of time, said control means generating a second control signal based upon a difference between said first measured data stored in said memory means and said second measured data signal, said second control signal causing said electronic flash to be re-energized to emit a second flash of light for a second period of time; and shutter means for routing light from said lens system to said to measuring means during at least a portion of said first predetermined period of time, and for routing light to image acquisition means during at least a portion of said second predetermined period of time.

2. The camera according to claim 1, wherein said second period of time is contiguous with said first period of time and so that said electronic flash is continuously energized.

3. A camera having an electronic flash that is energized in response to a release signal, comprising:
   means for directing light from outside said camera along a path inside said camera;
   aperture means for varying a depth of field;
   image acquisition means for forming an image of an object based upon said light directed by said directing means;
   shutter means for routing said light off of said path and to said image acquisition means when said shutter means is opened and for not altering said path when said shutter is closed;
   measuring means for receiving said light from said light directing means, for measuring a first amount of light incident upon said measuring means, for outputting a first measured data indicative of said first amount of light, and for outputting a second measured data based upon a second amount of light incident upon said measuring means during the emission of a first flash of light from said electronic flash;
   memory means; and
   control means responsive to said release signal for receiving said first measured data,
   for storing said first measured data in said memory means, for transmitting a first control signal to said electronic flash to cause said electronic flash to emit said first flash of light during a first predetermined period of time, and for generating a second control signal based upon said first measured data and said second measured data which causes said electronic flash to emit a second flash of light for a second predetermined period of time.

4. The camera according to claim 3, wherein said control means includes means for determining said second period of time based on a difference between said second measured data and the first measured data stored in said memory means.

5. The camera according to claim 3, wherein said first measured data stored in said memory means is measured by said measuring means when said electronic flash is not energized.

6. The camera according to claim 3, wherein said first measured data stored in said memory means comprise first object data and first background data and said control means generates said second control signal to control said electronic flash to emit said second flash of light based upon said first object data and said first background data measured by said measuring means and based upon said second measured data which comprises second object data and second background data.

7. The camera according to claim 3, wherein said second flash of light is used by said camera to acquire an image of said object and said image acquisition means comprises photographic film.

8. The camera according to claim 3, wherein said first measured data comprises first object data and first background data, said second measured data comprises second object data and second background data, and said control means generates said second control signal based upon said first object data, first background data, second object data, and second background data.

9. A method for controlling an amount of light emitted by an electronic flash, comprising the steps of:
   using shutter means in a first state to direct light to a measuring means and measuring a first amount of light incident upon the measuring means and generating a first data signal indicative of said first amount of light;
   receiving said first data signal at control means and storing said first data signal in memory means;
   generating, with said control means, a first control signal;
   emitting a first flash of light with said electronic flash in accordance with said first control signal;
   measuring a second amount of light incident upon said measuring means and generating a second data signal indicative of said second amount of light;
   generating, with said control means, a second control signal based upon said first data signal stored in said memory means and said second data signal;
   using said shutter means in a second state to direct light to image acquisition means; and
   emitting a second flash of light with said electronic flash in accordance with said second control signal.

10. The method according to claim 9, further comprising the step of acquiring an image of an object with photographic film during said step of emitting said second flash of light.

11. The method according to claim 9, wherein:
   said step of generating said first data signal comprises the steps of generating a first object data signal and a first background data signal;
   said step of generating said second data signal comprises the steps of generating a second object data signal and a second background data signal; and
   said second control signal is generated based upon said first object data signal, said first background data signal, said second object data signal, and said second background data signal.

* * * * *